United States Patent
Leblond

[15] 3,659,975
[45] May 2, 1972

[54] BAGLESS TIRE PRESS

[72] Inventor: Jean Leblond, Oise, France

[73] Assignee: Uniroyal Englebert France S.A., Neuilly-sur-Seine, France

[22] Filed: Aug. 17, 1970

[21] Appl. No.: 64,414

[52] U.S. Cl. .............................. 425/36, 144/288 A, 425/44, 425/17
[51] Int. Cl. ........................................... B29h 5/02
[58] Field of Search ............... 18/2 TM, 2 TP, 2 TT, 18 F, 18/17 W; 144/288 A

[56] References Cited

UNITED STATES PATENTS

| | | | |
|---|---|---|---|
| 2,820,937 | 1/1958 | Robbins | 18/18 F |
| 2,979,091 | 4/1961 | Noall | 18/2 TP UX |
| 3,130,446 | 4/1964 | Duerksen | 18/2 TT |
| 3,162,898 | 12/1964 | Fike | 18/2 TT X |
| 3,200,443 | 8/1965 | Maddox et al. | 18/2 TT X |
| 3,418,400 | 12/1968 | Clapp | 18/2 TT X |

FOREIGN PATENTS OR APPLICATIONS 895,196  5/1962  Great Britain ............ 18/2 TM Primary Examiner—J. Howard Flint, Jr.
Attorney—Robert J. Patterson

[57] ABSTRACT

An inflation press for use with tubeless tires, having utility in vulcanization equipment and all other mechanisms which require an air-tight bead seal. In contra-distinction to prior art approaches, the bead-sealing function is carried out by a pair of resilient annular rings each having one edge which is clamped in place and another edge which is freely deformable by suitable camming elements which are responsive to various nested fluid-operated jack mechanisms. This camming action distends the sealing rings radially outwardly against the beads of a tire or carcass to perform the sealing function during vulcanization or any other operation requiring an air-tight seal.

15 Claims, 21 Drawing Figures

INVENTOR.
JEAN LEBLOND
BY Robert J. Patterson

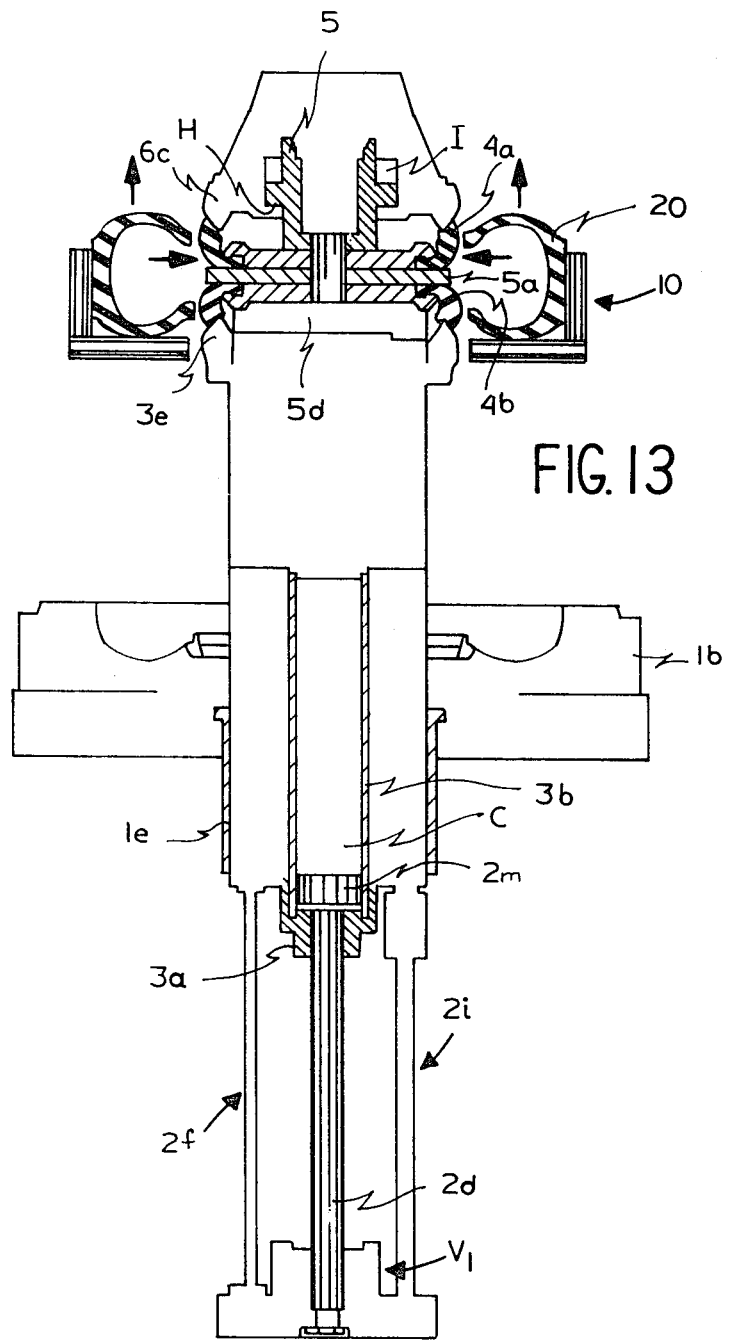

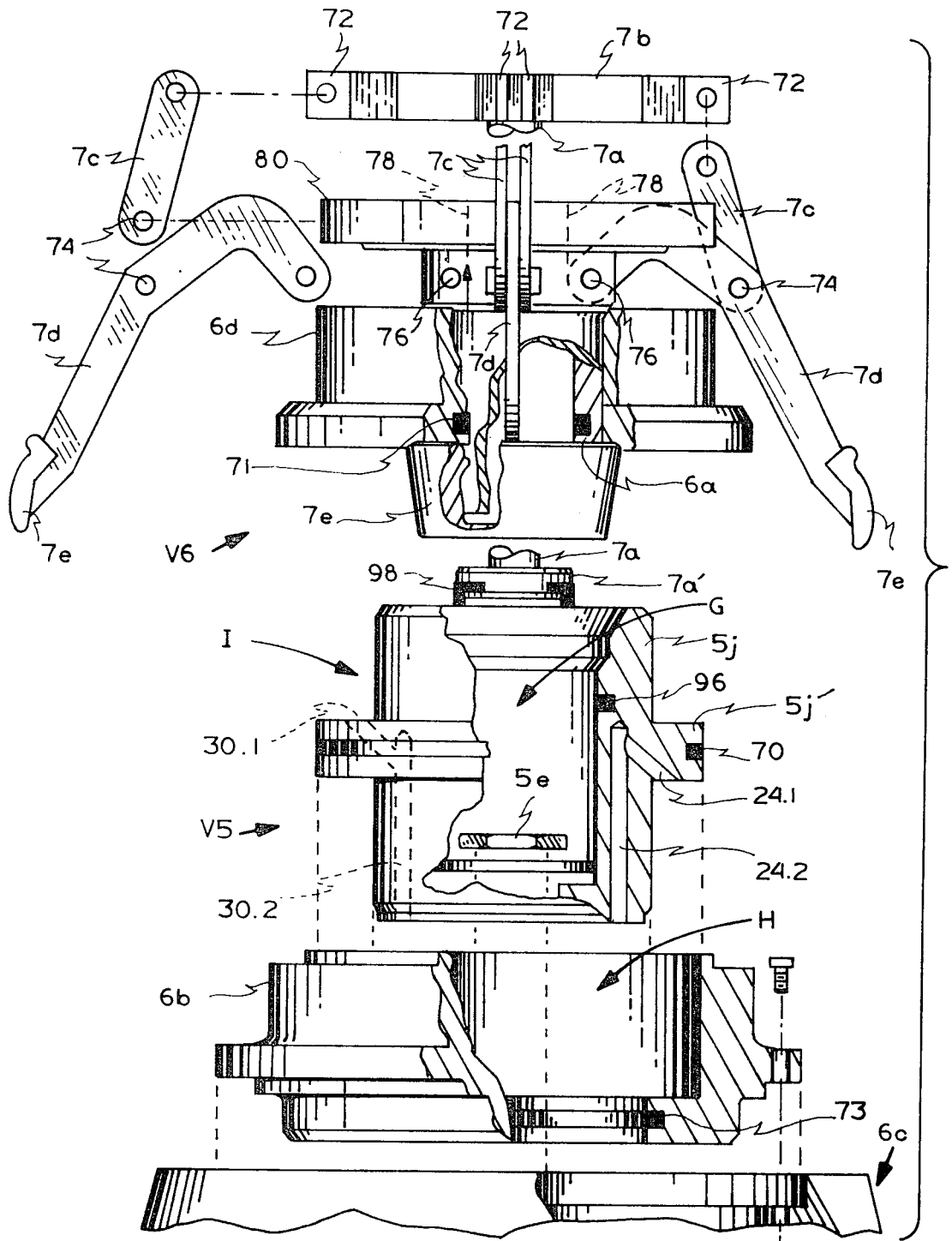

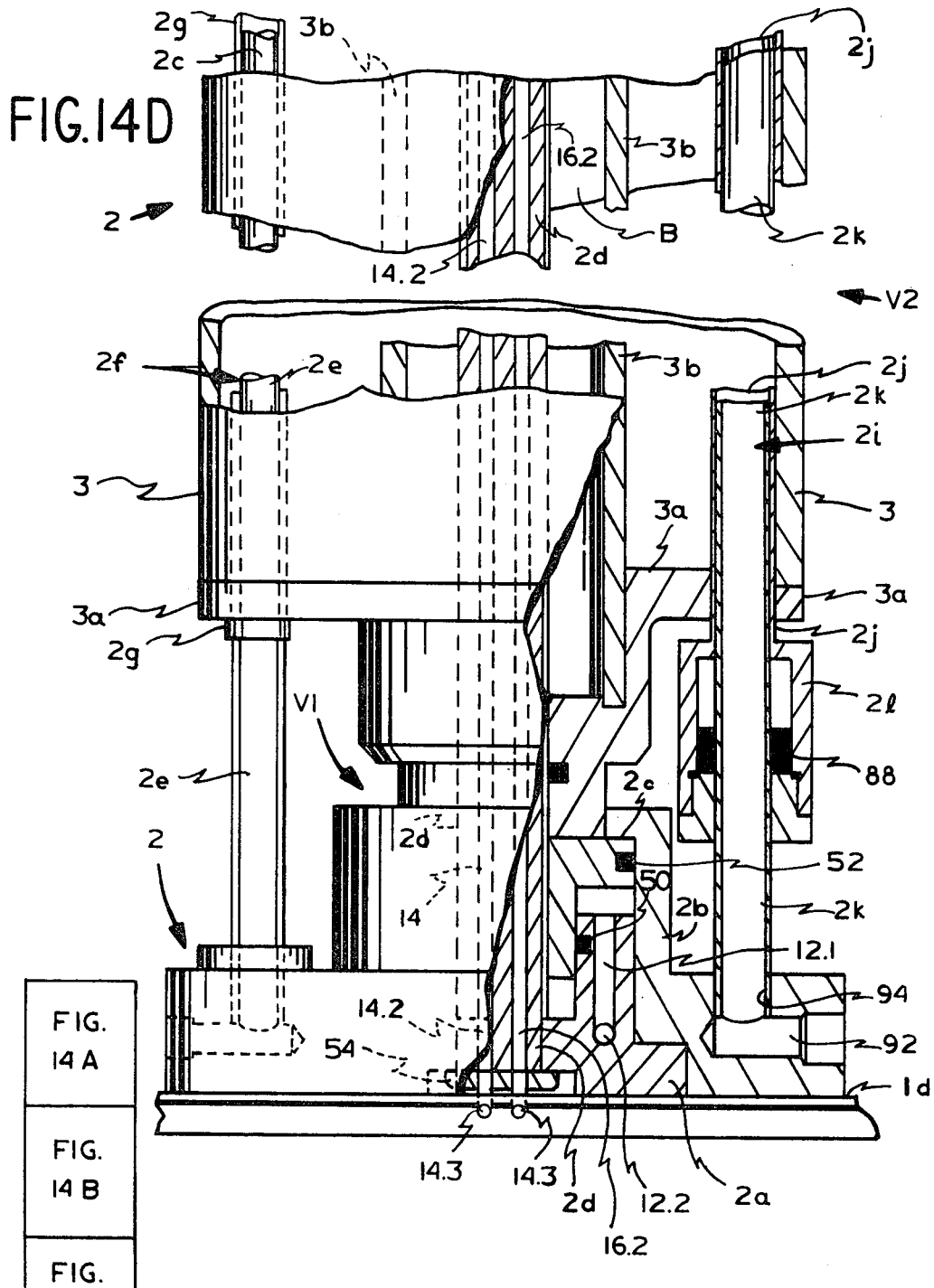

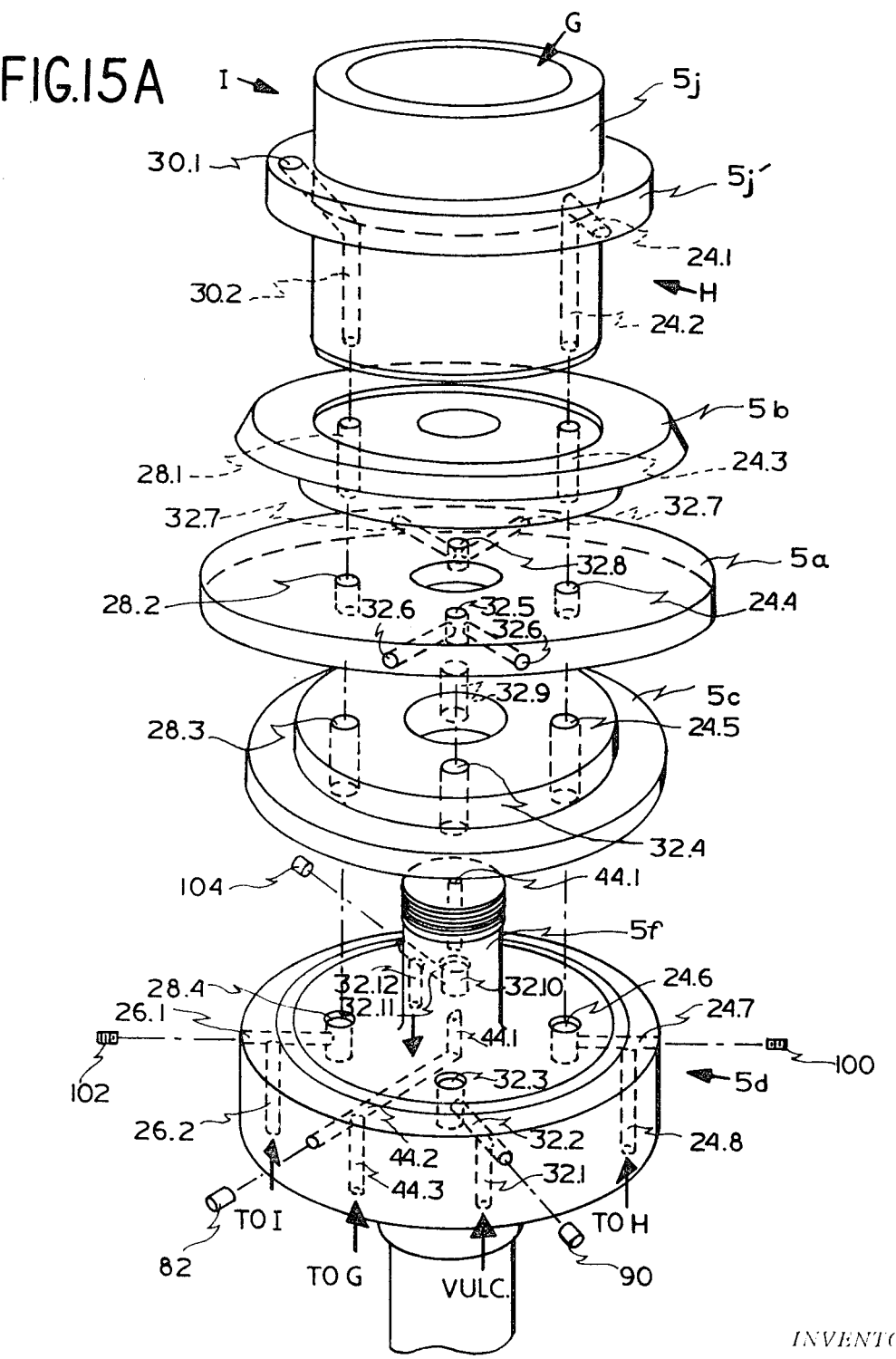

Patented May 2, 1972
3,659,975
19 Sheets-Sheet 19
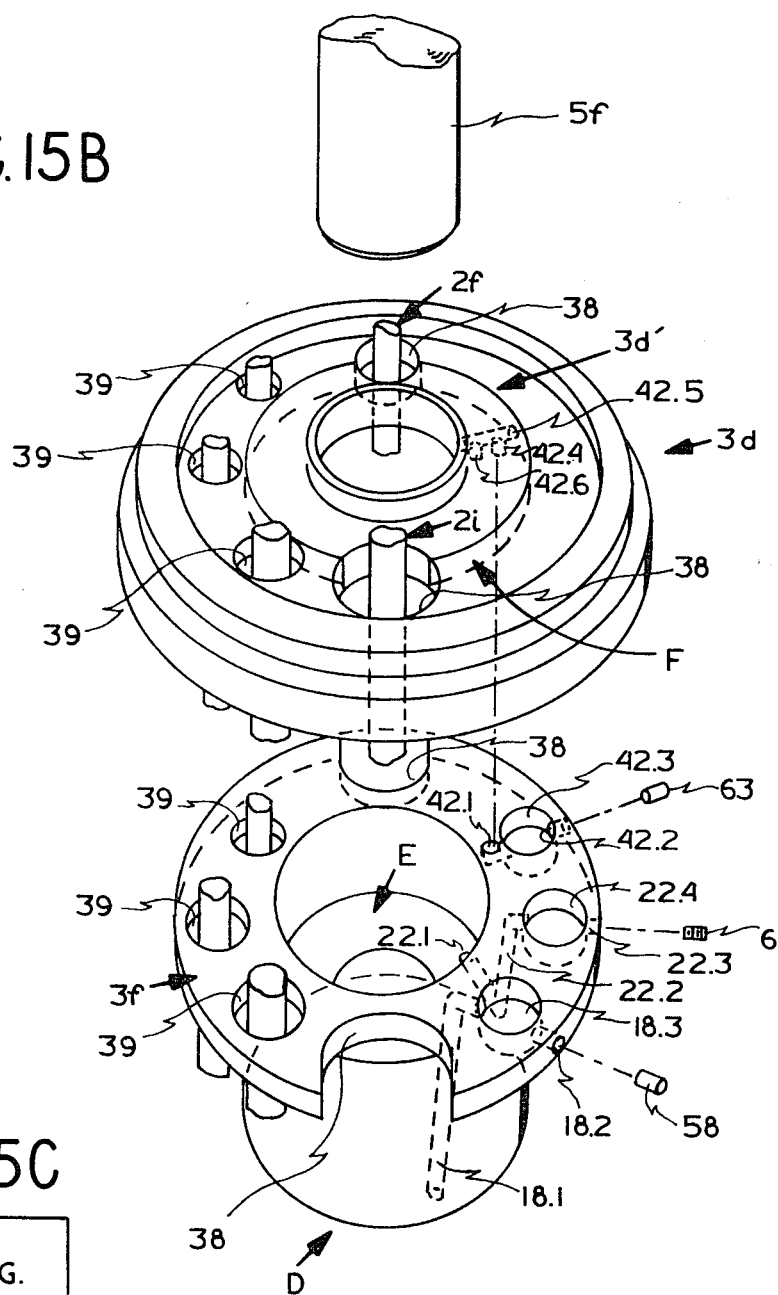
INVENTOR.
JEAN LEBLOND
BY Robert J. Patterson

BAGLESS TIRE PRESS

FIELD OF THE INVENTION

This invention is applicable generally to tire inflation equipment, and in particular to a bagless tire press for use in vulcanizing tubeless tire carcasses.

THE PRIOR ART

At the present time, vulcanization equipment for tubeless tire carcasses generally employs an inflatable bag or diaphragm inserted into the interior of the carcass, to act as a container for the hot vulcanizing fluid, usually steam or hot water. The use of such bags has several disadvantages. One of these is the fact that vulcanization requires a longer time because heat from the vulcanizing fluid must be transferred through the walls of the inflatable bag before it reaches the tire carcass.

Another disadvantage resides in the fact that the bag often causes substantial deformation during vulcanization, resulting in quality control problems and a relatively high rejection rate. The deformation often affects the tire beads, the dimensions of which are rather critical because they must make an airtight seal against the rim of the automobile wheel.

In addition, the bags themselves are fragile and wear out in a relatively short time. Replacement involves considerable loss of production time, since the assembly of a bag is a difficult operation.

Numerous attempts have been made to design vulcanizing presses for tubeless tires which do not require inflatable bags; which have instead some sort of rim to make sealing contact with the bead so as to contain the vulcanizing fluid within the tire carcass itself. Various rim assemblies have been devised, but all were characterized by non-articulated (although resilient) elastomeric bead-sealing members. Consequently sealing and releasing movement had to be imposed upon the sealing members by cumbersome mechanical linkages with considerable backlash, which were subject to imprecision and a rapid rate of wear. In addition, it is difficult to design these mechanisms in such a way as to protect them from the heat and pressure of the vulcanization fluid, which presents a rather difficult operating environment.

THE INVENTION

The invention attacks these problems by providing a bagless vulcanization press which is conventional in that it has a rim with resilient bead-sealing rings, but novel in that the rings are articulated, and operated by a mechanism which is entirely outside the vulcanization fluid envelope, and powered entirely by fluid-driven mechanisms. This results in low backlash, high precision, a low rate of wear, and isolation of the rim-operating mechanism from the heat and pressure of the vulcanization fluid.

In addition, the sealing rim assembly is separate from the halves of the vulcanization mold itself, so that the assembly is able to cooperate in loading and removing the finished tire from the mold.

The sealing rim of this invention is equally adaptable to equipment for mounting and sealing a cured tire on a post-vulcanization inflation and cooling rack, for mounting a tire on a wheel, for mounting and sealing a used tire carcass on a recapping press, for mounting or clamping tires on repair equipment, and various other devices requiring inflation of a tubeless tire.

BRIEF DESCRIPTION OF THE DRAWINGS

FIGS. 2 through 13 are a succession of similar sectional views, with various parts omitted or indicated only in outline, illustrating consecutive steps in the process of vulcanizing a tire carcass employing the equipment of FIG. 1.

And FIG. 15 is an exploded perspective view of selected parts of the equipment of the preceding figures, showing the internal jack-operating fluid conduits thereof. This figure comprises FIGS. 15A and 15B, assembled as indicated in FIG. 15C.

The same reference numerals refer to the same elements throughout the several views of the drawing.

DETAILED DESCRIPTION OF THE PREFERRED EMBODIMENT

Figure 1:
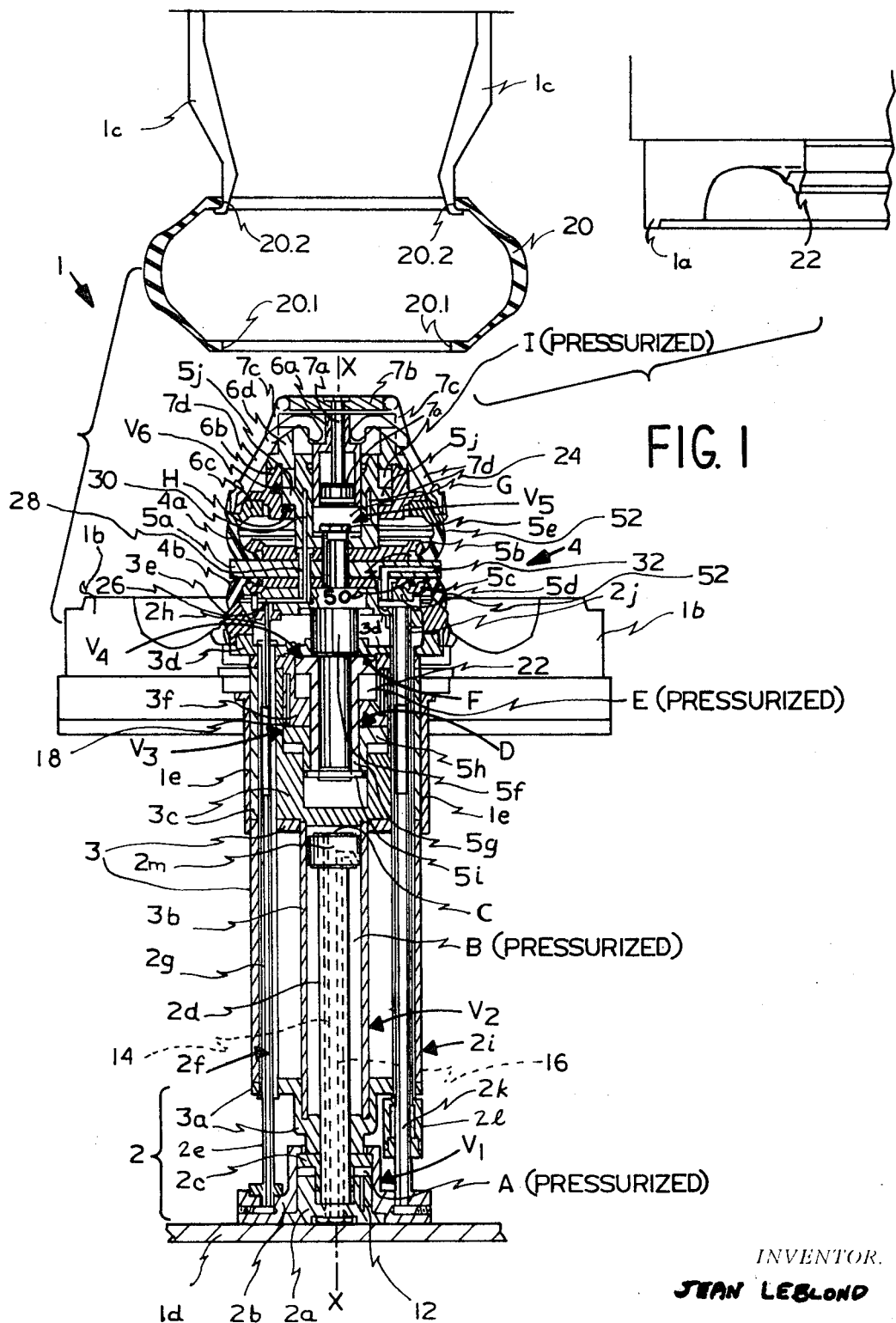
FIG. 1 is a vertical, axial section of a bagless tire curing press in accordance with the present invention.
Figure 14B:
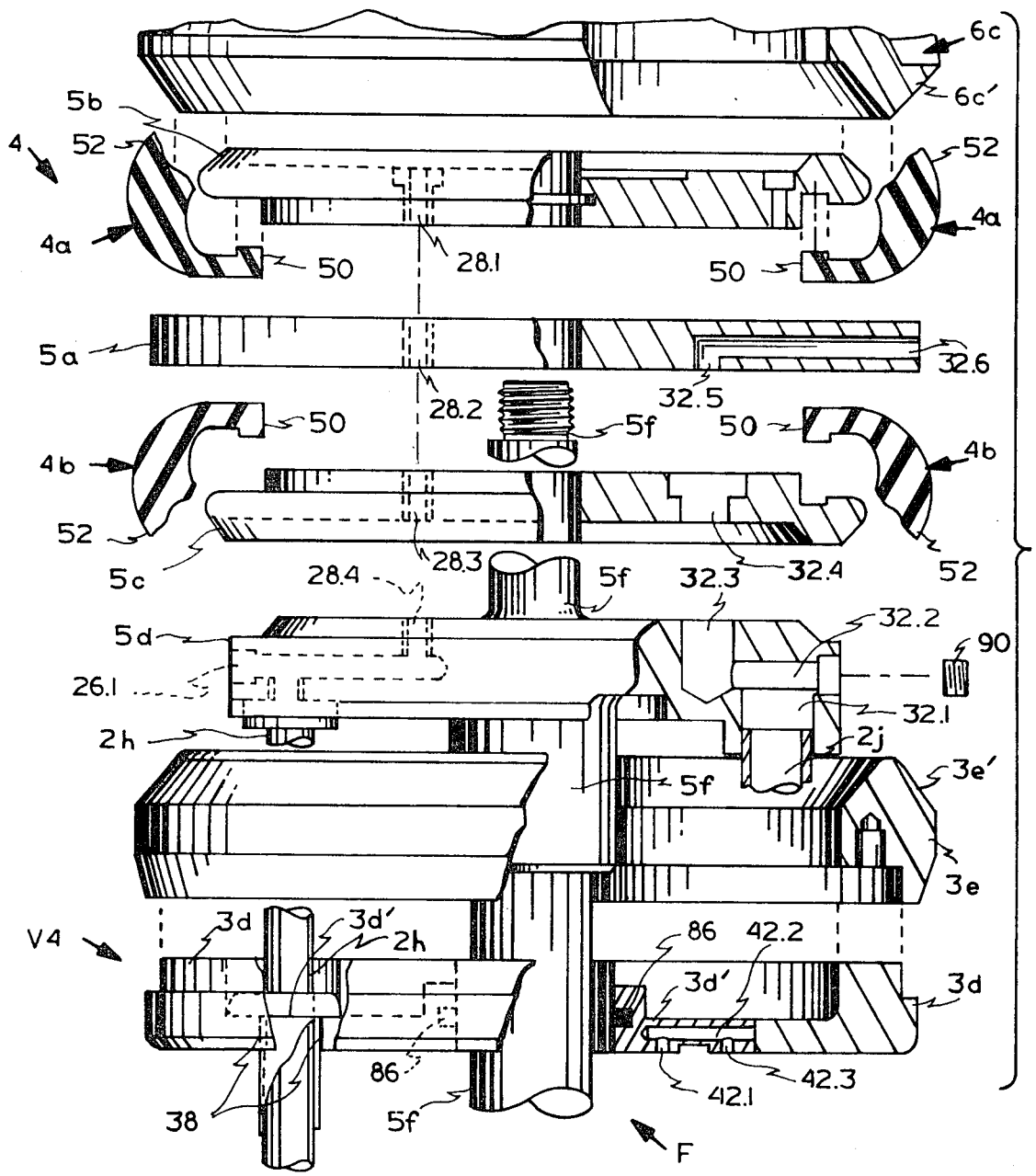
FIG. 14 is an exploded elevational view, with parts broken away and sectioned for clarity of illustration, of the equipment of the preceding figures. This figure comprises FIGS. 14A through 14D, assembled as indicated in FIG. 14E.
Figure 14C:
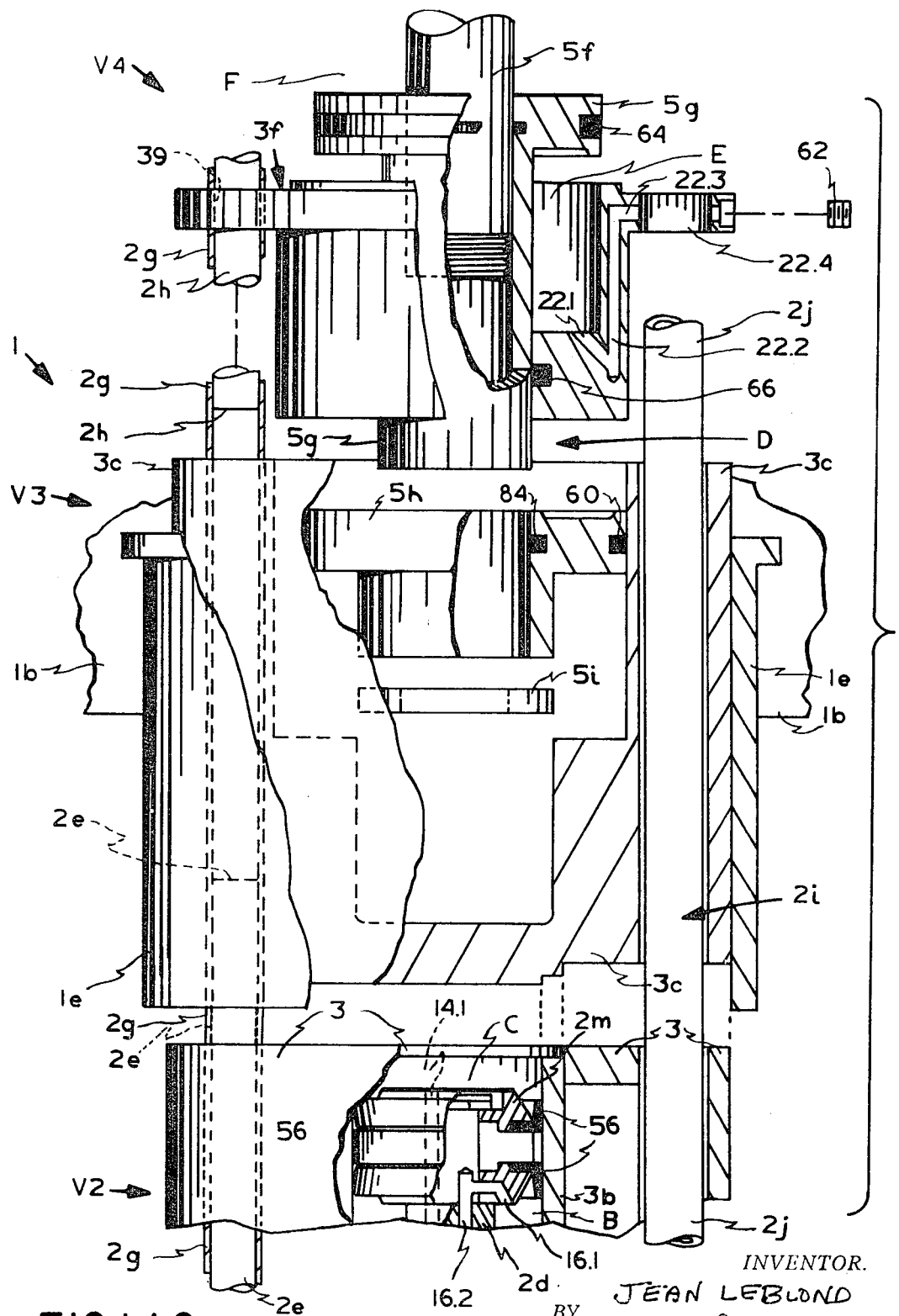

Structure; FIGS. 1, 14 and 15

Reference numeral 1 generally designates a tire curing press comprising an upper mold shell 1a and a lower mold shell 1b. The latter shell is affixed to an upstanding columnar structure 1e rising from a base generally designated 2 resting on a platform 1d. There is also a conventional carcass loader device, of which only the supporting hooks 1c are illustrated, serving to load an uncured tire carcass 20 onto the lower mold shell 1b. Thereafter, the upper mold shell 1a is deposited over the tire carcass 20 to form a complete vulcanizing mold entirely surrounding the carcass 20. Vulcanization then takes place, as in previous bagless curing presses, by introducing the hot vulcanizing fluid into the interior of the tire carcass while it is clamped within the vulcanizing mold 1a, 1b.

In order to retain the vulcanizing fluid under pressure within the interior of the tire carcass 20, there is provided a rim assembly generally designated 4, which expands radially outwardly against the beads 20.1 and 20.2 of the tire carcass, to make sealing contact therewith. This rim assembly comprises a pair of resiliently deformable sealing rings 4a and 4b which engage with the upper and lower tire beads respectively, and which are formed of a synthetic rubber or other elastomeric material capable of retaining its properties under the conditions of heat and pressure imposed upon it by the vulcanizing fluid. In addition, the rim assembly 4 comprises a bearing plate 5a to which the sealing rings 4a and 4b are clamped by plates 5b and 5c respectively. The entire rim assembly rests upon another plate 5d which in turn is fixed to a vertical shaft 5f having various different outside diameters at different locations along its length. This shaft has a cap-nut 5e at the upper end thereof and a supporting ring 5i at the lower end thereof, both of which are threaded to the shaft.

The geometry of the entire curing press 1 is cylindrical with respect to axis X—X, and the shaft 5f is moveable vertically along that axis to raise and lower the rim assembly 4 relative to the fixed parts of the mechanism, which include the base 2, the platform 1d, the supporting sleeve 1e and the lower mold shell 1b. Various raising and lowering operations are carried out by a plurality of nested fluid-operated jacks described below.

Some of these jacks perform the function of radially expanding and contracting the bead-sealing rings 4a and 4b. Note that each of these rings has a generally horn-like, or curved frusto-conical configuration, the upper bead-sealing ring 4a tapering downwardly, and the lower bead-sealing ring 4b tapering upwardly. The narrower annular edge 50 of each sealing ring 4a and 4b is secured by clamping between its respective clamping plate 5b or 5c and the central bearing plate 5a. The wider annular edge 52 of each sealing ring is free-standing and flexible, owing to the resiliently deformable nature of the elastomeric material of which the rings are made. Accordingly, downward relative motion of an upper deformation crown 6c, which has a downwardly tapering conical outer surface 6c', causes that surface to cam the free edge 52 of the upper sealing ring 4a radially outwardly. Similarly, the free edge 52 of the lower sealing ring 4b is cammed radially outwardly by upward relative motion of a lower deformation crown 3e, which also has a conical outer camming surface 3e' for that purpose.

The necessary vertical motion for radially distending and relaxing the bead-sealing rings is carried out, sometimes in successive steps, by the various fluid-operated jacks, which will now be described. There are six such jacks generally designated V1 through V6 respectively, which are operated by a suitable fluid (for example compressed air) and nested one within the other. That is to say, the moving piston or cylinder of one of the jacks may provide a moveable reference platform from which the moving piston or cylinder of another jack is raised or lowered.

Jack V1 comprises a cylinder formed by a pair of dove-tailing cylindrical shells $2a$ and $2b$, both of which form part of base 2 fixed in place on the platform $1d$. Reciprocable between upper and lower limits defined by cylinder members $2b$ and $2a$ respectively, is the piston $2c$ of jack V1, which encircles a fixed upstanding rod $2d$ and is slidable relative thereto. Gaskets 50 and 52 form slidable seals between piston $2c$ and cylinder members $2a$ and $2b$ respectively. Chamber A of this jack may be filled with fluid through a conduit 12 formed in the cylindrical member $2a$, thus driving the piston $2c$ upwardly. The conduit comprises a vertical passage 12.1 and a horizontal passage 12.2 drilled in the cylinder member $2a$.

Jack V2 has a fixed piston $2m$ which is held at a constant height relative to the platform $1d$ by means of the upstanding rod $2d$, which is secured to member $2a$ by a threaded nut 54. The cylinder of this jack, which is the moveable part, comprises a cylindrical sleeve $3b$, a lower cover member $3a$ which is fixed to the lower end thereof, and an upper cylinder cover formed by member $3c$ fixed to the upper end of the sleeve $3b$. There is also an outer shell 3 assembled at its lower end with member $3a$, and having a flange at its upper end which is assembled with members $3b$ and $3c$. Jack V2 is a double-acting device. Thus, fluid introduced into chamber C, through a vertical conduit 14 formed in the piston $2m$ and upstanding rod $2d$, causes the cylinder assembly of jack V2, (i.e. members $3a$, $3b$ and $3c$) to move upwardly relative to the fixed piston $2m$; whereas fluid introduced into chamber B by means of a conduit 16 drives the cylinder assembly to its lower limiting position. Conduit 16 comprises a passage 16.1 formed in the piston $2m$, a passage 16.2 formed in the rod $2d$, and an L-shaped passage 16.3 formed in platform $1d$. Similarly, conduit 14 comprises passage 14.1 formed in piston $2m$, a passage 14.2 formed in rod $2d$, and an L-shaped passage 14.3 formed in the platform $1d$. Gaskets 56 form slidable seals between piston $2m$ and cylinder sleeve $3b$.

Jack V3 employs the closed-end cylinder member $3c$ as its lower cylinder shell and an annular member $3f$ as its upper cylinder cover. Between these two members is a moveable piston $5h$ which is driven downwardly when chamber D is filled with pressurized fluid through conduit 18 formed in member $3f$. The latter comprises vertical passage 18.1, horizontal passage 18.2 (the outer end of which is sealed by a threaded plug 58) and vertical passage 18.3. A gasket 60 provides a sliding seal between piston $5h$ and cylinder member $3c$.

Jack V4 is another double-acting device, employing the annular member $3f$ as its lower cylinder shell and an annular disc $3d$, $3d'$ as its upper cylinder cover. Filling of chamber F by fluid delivered under pressure through conduit 42 formed in member $3f$ drives an annular piston member $5g$ downwardly, whereas the pressurizing of chamber E through conduit 22 also formed in member $3f$ drives the piston upwardly. Conduit 22 comprises a passage 22.1 leading upwardly at an angle, passage 22.2 leading downwardly, horizontal passage 22.3 (the outer end of which is sealed by a threaded plug 62) and a vertical passage 22.4. Conduit 42 comprises a vertical passage 42.1, a horizontal passage 42.2 (the outer end of which is sealed by a threaded plug 63) and a vertical inlet passage 42.3, all formed in member $3f$; a vertical passage 42.4 which connects with passage 42.1, a horizontal passage 42.5 (the outer end of which is sealed by annularly surrounding member $3d$) and a vertical outlet passage 42.6, all formed in member $3d'$. Gaskets 64 and 66 provide sliding seals between piston $5g$ and cylinder member $3f$.

Jack V6 is another double-acting device in which a moveable cylinder comprising an annular upper cover member $6d$ and an annular lower cover member $6b$ reciprocate vertically with respect to a piston $5j$. In order to drive the cylinder assembly downwardly relative to the piston, chamber H is filled with fluid by means of a conduit 24. This moves the deformation crown $6c$ downwardly. In order to drive cylinder assembly and deformation crown upwardly, on the other hand, chamber I is filled with pressurized fluid through conduits 26, 28 and 30 formed in members $5d$, $5c$, $5a$, $5b$ and $5j$ respectively. Conduit 24 comprises downwardly slanted passage 24.1 and vertical passage 24.2 formed in member $5j$, passages 24.3, 24.4 and 24.5 formed in members $5b$, $5a$ and $5c$ respectively, and a vertical passage 24.6, horizontal passage 24.7 (the outer end of which is sealed by a threaded plug 100) and vertical passage 24.8 all formed in member $5d$. Conduit 30 comprises upwardly slanting passage 30.1 and vertical passage 30.2 formed in member $5j$; conduit 28 comprises passages 28.1, 28.2 and 28.3 formed in members $5b$, $5a$ and $5c$ respectively and vertical passage 28.4 formed in member $5d$; and conduit 26 comprises horizontal passage 26.1 (the outer end of which is sealed by a threaded plug 102) and vertical passage 26.2 also formed in member $5d$. Gaskets 70 and 73 provide sliding seals between piston $5j$ and lower cylinder member $6b$, a gasket 71 provides a sliding seal between piston $5j$ and the upper cylinder member $6d$, and a gasket 96 provides a sliding seal between piston $5j$ and a tubular member $6a$ which is received therein close off the upper end of the cylinder formed by members $6d$ and $6b$.

Jack V5 serves the purpose of articulating members $7c$ and $7d$ which help transfer the tire carcass 20 from the loading arms $1c$ into vulcanizing position on the press 1. The lower cylinder shell of this jack is annular member $5j$, and the upper cylinder shell is the tubular member $6a$. The piston of this jack, designated $7a'$, is moveable within the tubular upper cylinder $6a$ in response to the pressure of the fluid introduced into chamber G formed in the interior of cylinder $5j$, and carries with it a rod $7a$ and plate $7b$ which drives pairs of links $7c$ pivotally connected to plate $7b$ by means of lugs 72. Links $7c$, in turn, are articulated at locations 74 to arms $7d$, which are pivoted to lugs 76 of the cylinder member $6a$ and are moveable vertically in notches 78 formed in a plate 80 at the top of cylinder $6a$. Arms $7d$ are formed with horizontally extended tire-supporting hangers $7e$.

Chamber G is supplied with fluid by means of a conduit 44 comprising a passage 44.1 extending downwardly through shaft $5f$, passage 44.2 extending radially through member $5d$ (the outer end of which is sealed by a threaded plug 82) and vertical passage 44.3 also formed in member $5d$. A gasket 98 surrounding piston $7a'$ provides a sliding seal against the interior of cylinder $5j$.

There are four loader arms $1c$, and four sets of articulated links and rods $7c$ and $7d$ which are angularly staggered with relation to the loader arms to avoid interference therewith when the loader arms are lowered to transfer the tire carcass 20 to the articulated rods $7d$ and ultimately to the lower mold shell $1b$.

The immobile members of the tire press 1 include base members $2a$ and $2b$, platform $1d$, and the lower mold shell $1b$ and its supporting members including cylindrical housing $1e$. Upstanding rod $2d$, which fixedly supports piston $2m$ of jack V2, is also fixed upon the base 2; as are tubes $2e$ and $2k$, which serve a function detailed below.

Turning attention to the moving parts of the press, these include piston $2c$ of jack V1, which annularly surrounds the fixed upstanding rod $2d$ and is vertically slidable thereon for movement between the upper and lower limits imposed by its upper and lower cylinder shells $2b$ and $2a$ respectively, which also annularly surround the upstanding rod $2d$, but are fixed members of the base structure 2.

Members $3a$, $3b$ and $3c$ are vertically mobile, but are secured together to form the cylinder enclosure of jack V2. In addition the lower portion of an annular member $3f$ is fixed within an upper sleeve of member 3c, but the entire assembly 3a, 3b, 3c, 3f is vertically slidable on the fixed upstanding rod 2d and fixed piston 2m. This assembly also rests on, but is not affixed to, the piston 2c of jack V1.

Shaft 5f has several angularly surrounding members which are secured thereto for movement as a unit, by means of the cap nut 5e and disc 5i threaded to the upper and lower extremities thereof respectively. In descending order, these include: cylindrical member 5j which acts as the lower cylinder shell of jack V6 and also has a flange 5j' causing it to act as the piston of jack V5; the rim assembly 4 (including the sealing ring bearing plate 5a, plates 5b and 5c which clamp the sealing rings 4a and 4b thereto respectively, and the common supporting plate 5d); and sleeve 5g which acts as the piston of jack V4. Thus when chamber E of jack V4 is pressurized, piston sleeve 5g raises shaft 5f and all the enumerated parts fixed thereto. This assembly rests on either member 3f or member 3c of the cylinder assembly of jack V2, but the flange of sleeve 5g is slidable within member 3 f, while the disc 5i is moveable within member 3c.

Annular piston member 5h of jack V3 annularly surrounds the shaft 5f and sleeve 5g, and is slidable vertically thereon, gasket 84 making a sliding seal therebetween. But under certain circumstances (assembly of shaft 5f moving up, or piston 5h moving down) piston member 5h engages the disc 5i of the shaft assembly to move therewith as a unit.

Piston member 5h also is slidable within the enclosure formed by the upper sleeve of member 3c, gasket 60 making a sliding seal therebetween. Thus member 3c, in addition to being part of the moving cylinder of jack V2, forms the lower cylinder member of jack V3. The upper cylinder cover of this jack is the annular member 3f which slideably surrounds shaft 5f but is fixed in the upper sleeve of member 3c. Thus piston 5h moves between upper and lower limits imposed by members 3f and 3c respectively.

The lower sealing ring deformation crown 3e, it should be noted, is fixed to a disc comprising an annular ring 3d and central web 3d' fixed together. This disc 3d, 3d' in turn rests on the fixed lower mold shell 1b; but these members can be raised upwardly from shell 1b, since disc 3d, 3d' is slidable on shaft 5f, and responds to pressure in chamber F. A gasket 86 makes a sliding seal between members 3d' and 5f. Thus, radial expansion of the sealing ring 4b may be achieved either by raising the disc 3d, 3d' and deformation crown 3e, or by lowering the rim assembly 4.

The entire cylinder assembly 6d, 6b of jack V6 (the one which expands the upper sealing ring 4a) rests on the flange 5j' of its piston 5j, which forms part of the assembly of shaft 5f. This cylinder assembly 6d, 6b has the upper sealing ring deformation crown 6c affixed thereto for movement as a unit to distend ring 4a.

Finally, the articulated links and arms 7c and 7d and the jack V5 for operating them also rest on the assembly of shaft 5f, via the cylindrical housings 6a and 5j.

After the carcass 20 is set in place between the upper and lower mold shells 1a and 1b respectively and sealed off by the rim assembly 4, the vulcanizing fluid is introduced into the interior of the carcass by means of a fluid conduit generally designated 2i. This includes a lower tube 2k which is fixed to base member 2b and an upper tube 2j which is fixed to the moveable supporting plate 5d, surrounds tube 2k, and telescopes therewith. A gland 21 at the lower end of tube 2j slidably surrounds tube 2k and comprises a gasket 88 to permit vertical displacement of the supporting plate 5d without disrupting the vulcanizing fluid connection. The vulcanizing fluid first enters lower tube 2k through horizontal passage 92 and vertical passage 94 formed in base member 2b. From there it runs up the tube 2j, through a vertical passage 32.1, horizontal passage 32.2 (the outer end of which is sealed by a threaded plug 90) and vertical passage 32.3 all formed in member 5d, and vertical passages 32.4 and 32.5 formed in members 5c and 5a respectively; and then exits through twin horizontal passages 32.6 also formed in the member 5a, and leading to the interior of the tire carcass 20.

Other telescoping tubing assemblies, not all of which can clearly be shown in these drawings, are employed for evacuating the vulcanizing fluid from the carcass and conducting the jack-operating fluid into and out of jack chambers D through I. For pressurizing chamber I, as a specific illustrated example, there is a conduit generally designated 2f, which includes a lower tube 2e fixed to the base member 2b, an upper tube 2h which is fixed to the moveable supporting plate 5d, and a central tube 2g which is suspended from member 3d and telescopes with tubes 2e and 2h to maintain an undisrupted fluid connection during vertical movement of the various jack members described above. Ultimately, the fluid delivered through tubes 2e, 2g and 2h proceeds through the described passageways 26, 28 and 30 to jack chamber I.

The vulcanizing fluid is evacuated at the proper time through twin horizontal passages 32.7 leading from the interior of the tire 20, and a vertical passage 32.8, all formed in member 5a. Then it proceeds through vertical passages 32.9 and 32.10 formed in members 5c and 5d respectively, and horizontal passage 32.11 (the outer end of which is sealed by a threaded plug 104) and vertical passage 32.12 also formed in member 5d.

There is a telescoping tubular connection (not shown) of the type described feeding upwardly into each of the three vertical passages 18.3, 22.3 and 42.3 formed in the flange of member 3f, for pressurizing and evacuating chambers D, E and F respectively; and the same is true for each of the five vertical passages 32.1, 32.12, 24.8, 26.2 and 44.3 formed in member 5d, for injecting and evacuating vulcanization fluid, and pressurizing and evacuating chambers H, I and G respectively. Only two of these telescoping assemblies 2i and 2f, connected to passages 32.1 and 26.2 respectively, have been shown and described; but those two exemplify the others, which are entirely similar in design to those described.

The three telescoping tube assemblies (not shown) depending from the flange of member 3f are spaced circumferentially as indicated by the spacing of their associated passages 18.3, 22.3 and 42.3. The five telescoping tube assemblies (including assemblies 2i and 2f) depending from member 5d are located diametrically opposite the three just mentioned, and are spaced circumferentially as indicated by their associated passages 32.1, 32.12, 24.8, 26.2 and 44.3. Note also the five clearance openings 38 and 39 formed in members 3d, 3d' and 3f, through which these five tube assemblies ride vertically.

Operation: FIGS. 1–13

Initially, all of the parts of the vulcanizing press 1 are in the condition illustrated in FIG. 1. Jack chambers A, B, E and I are pressurized, while chambers C, D, F, G and H are not. The raw tire carcass 20 is supported axially above the press 1 by means of the loading arms 1c, and the upper mold shell 1a is stored at some convenient nearby location until needed. Edges 52 of the elastomeric bead-sealing rings 4a and 4b are at rest; i.e. they are retracted radially inwardly.

Figure 2:
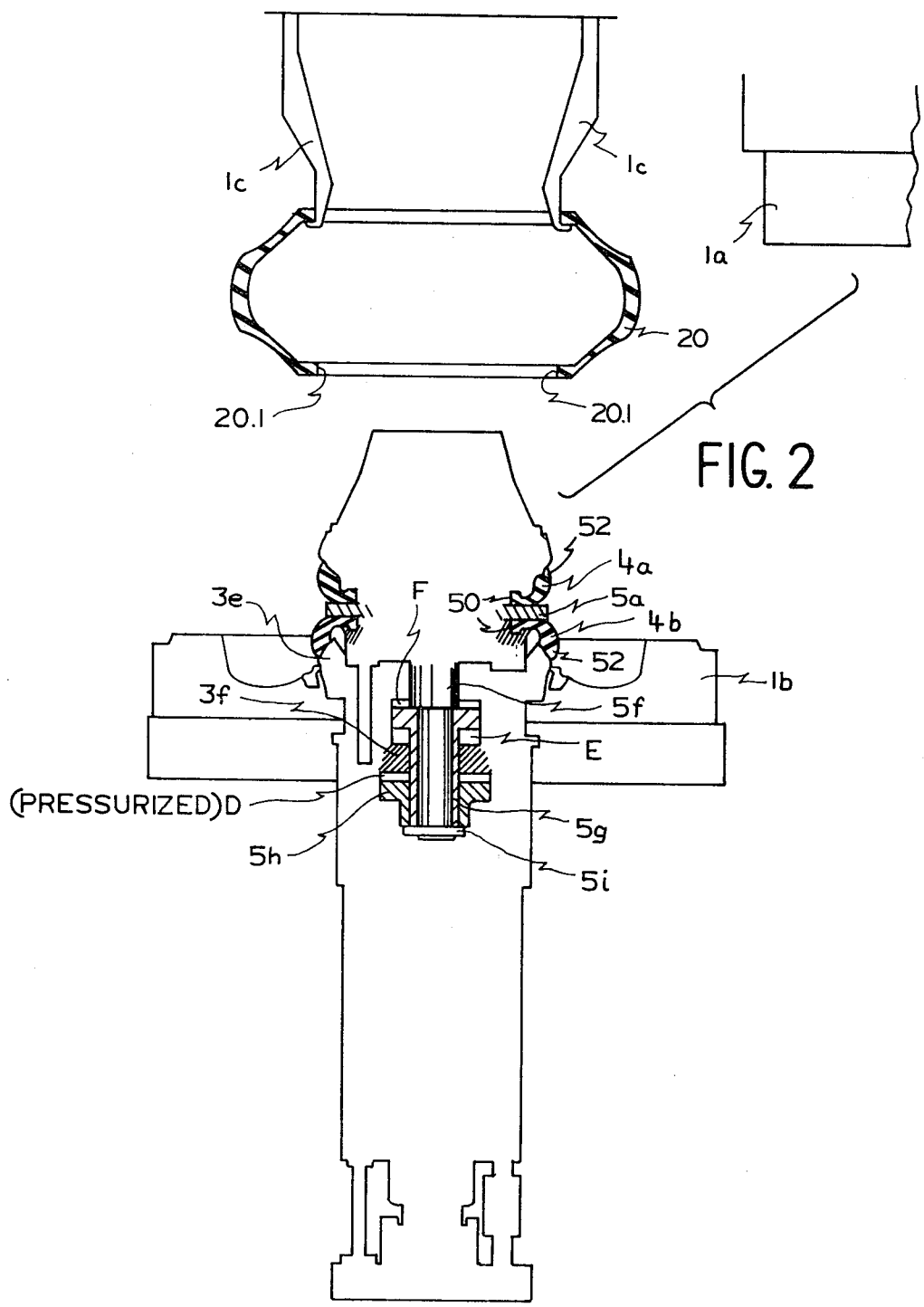

Then, as illustrated in FIG. 2, chamber D of jack V3 is pressurized, thus driving the piston sleeve 5h thereof downwardly against the disc 5i. Consequently, shaft 5f and all other components secured thereto are driven axially downwardly. While this downward motion is in progress, disc 3d and deformation crown 3e remain stationary, since they rest on mold shell 1b. This produces a camming action of the conical surface of deformation crown 3e against the deformable outer edge 52 of bead-sealing ring 4b. The described camming action causes the lower elastomeric beadsealing ring 4b to expand radially one step, i.e. until its outside diameter is equal to the inside diameter of the lower beads of the tire carcass.

Figure 3:
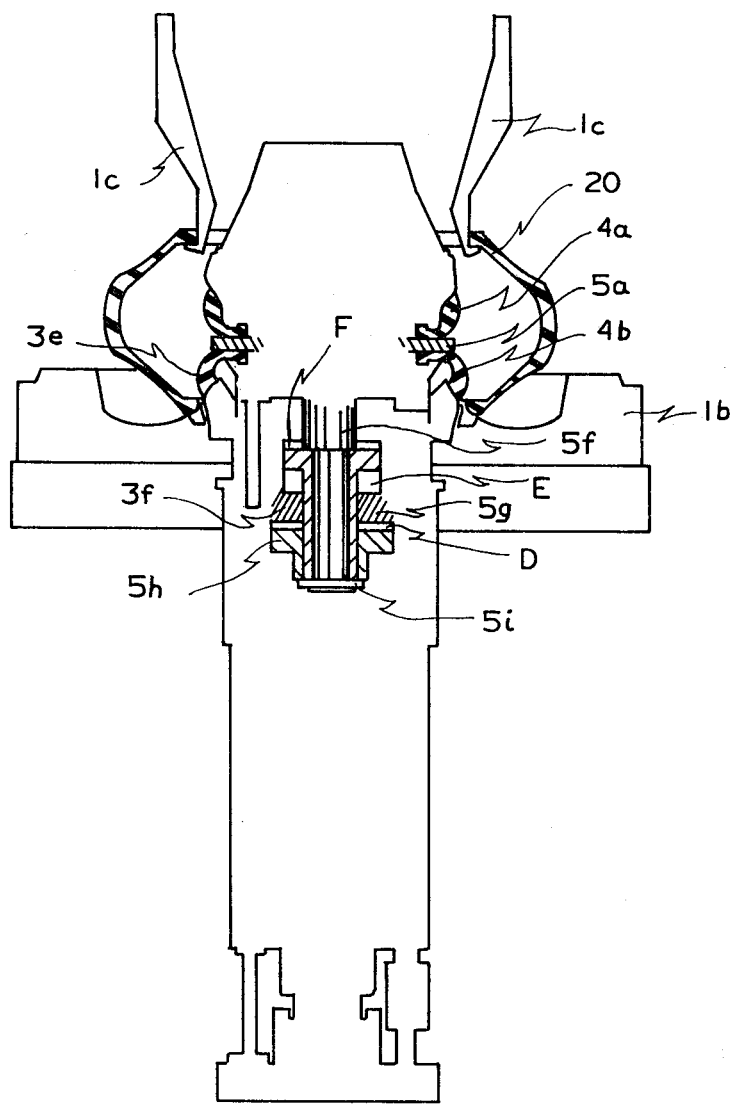

Next, as seen in FIG. 3 the carcass loader device 1c lowers the tire carcass 20 onto the lower mold shell 1b. As this occurs, the lower bead 20.1 thereof cams over the conical surface of the lower lower bead sealing ring 4b, in order to guide the tire carcass 20 into concentric relationship with axis X—X. The first step of expansion of the lower bead-sealing ring 4b, just accomplished as described above in connection with FIG. 2, makes this camming and centering action possible by equalizing the outside diameter of the lower bead-sealing ring and the inside diameter of the lower bead.

Figure 4:
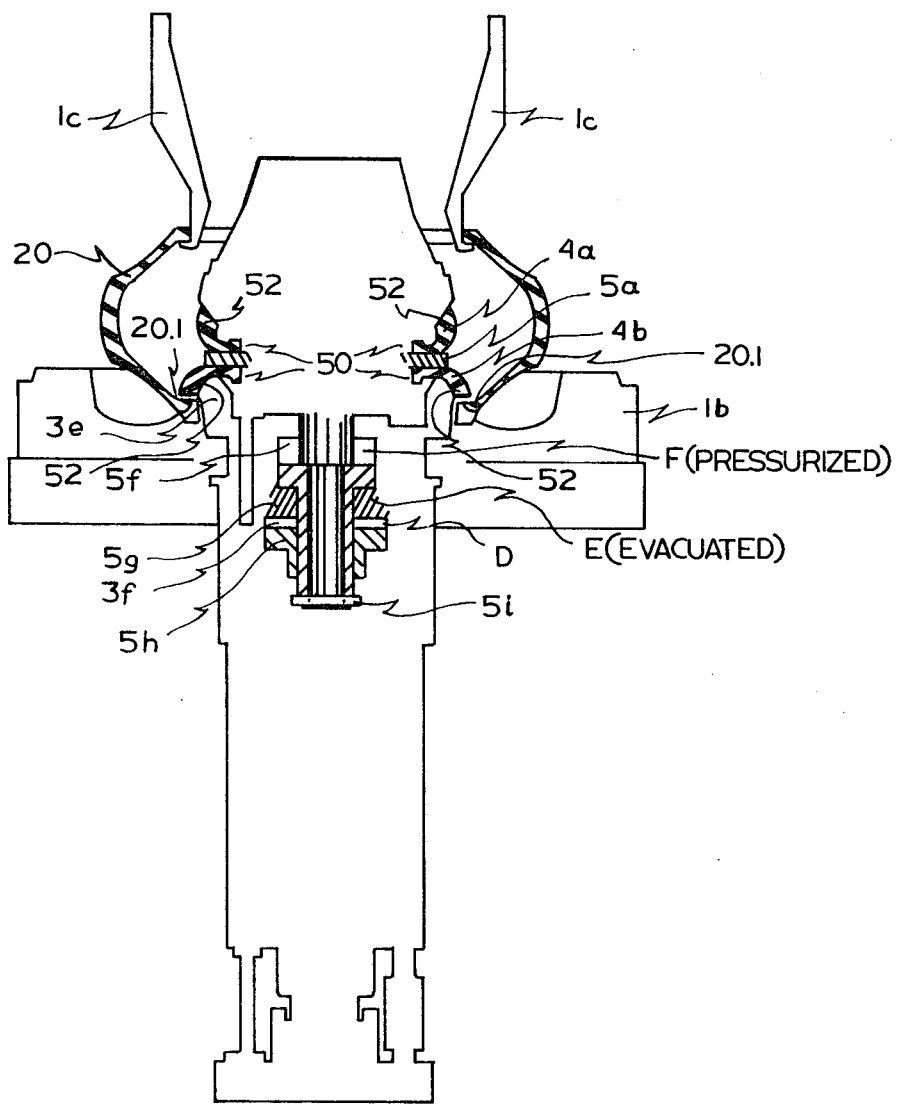

Next, as seen in FIG. 4, jack chamber F is pressurized and jack chamber E is evacuated. Since jack chambers I, B, A and D remain pressurized, this causes upward movement of the disc 3d, 3d' which supports deformation crown 3e of bead-sealing ring 4b. It also causes a downward axial movement of piston sleeve 5g, bringing the entire assembly of shaft 5f with it, including the rim assembly 4. Thus the lower sealing ring 4b is driven the rest of the way down toward its deformation crown 3e, completing the expansion of that ring. This final step of expansion causes the lower edge 52 of ring 4b to expand past the lower tire bead 20.1, and into the interior of the carcass 20, until the ring 4b is expanded to its maximum extent.

Figure 5:
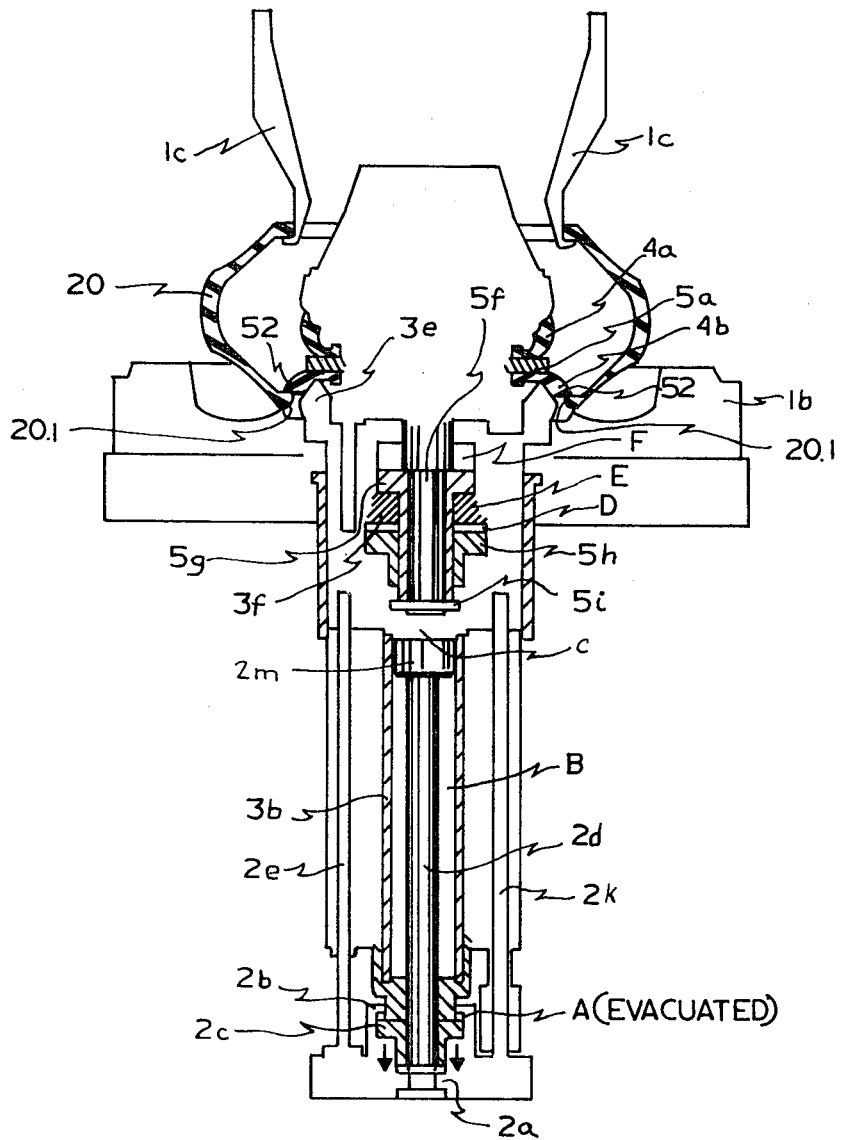

Then, as illustrated in FIG. 5, jack chamber A is evacuated, so that the pressure remaining in jack chamber B is able to produce a downward axial translation of piston 2c to its lower limit, lowering the entire cylinder assembly 3a, 3b, 3c and the entire assembly of shaft 5f, including the rim assembly 4, and the crown 3e so as to clamp the lower bead 20.1 between the lower mold 1b and the bead-sealing ring 4b.

Figure 6:
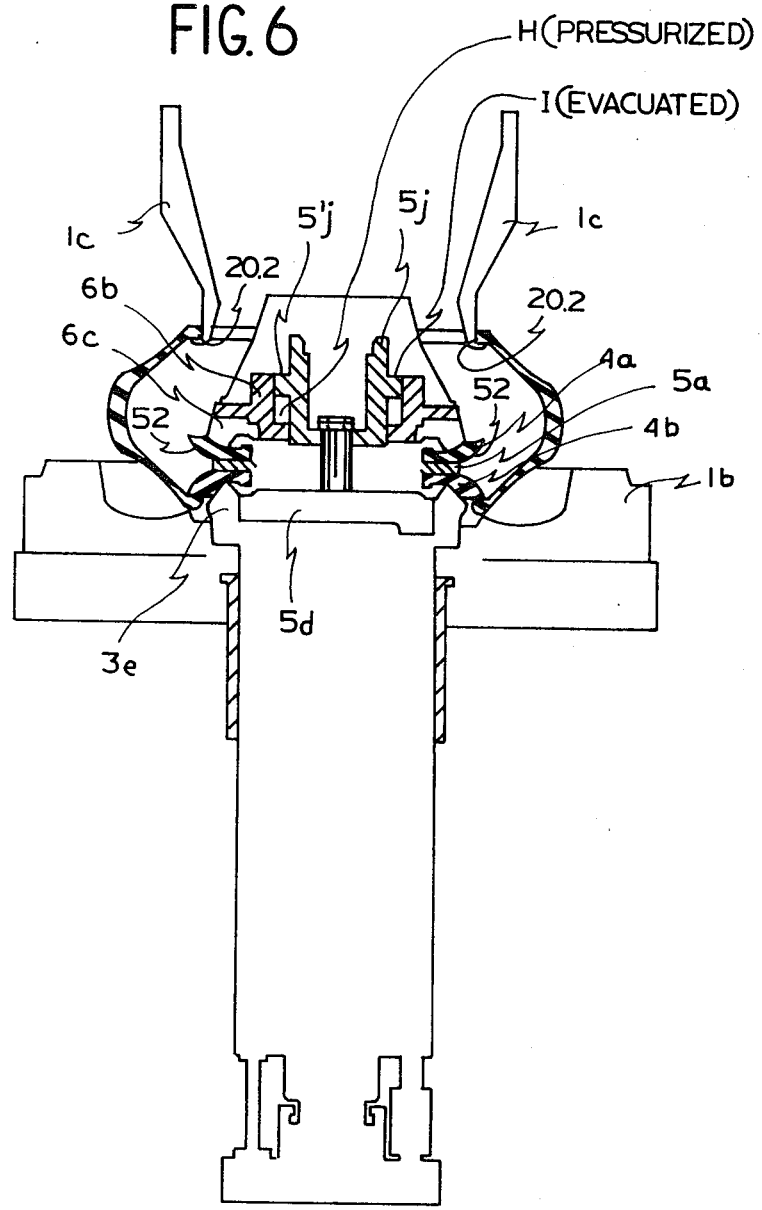

In the next step of the operation, illustrated by FIG. 6, jack chamber H is pressurized and jack chamber I is evacuated. This has the effect of driving member 6b, and the upper deformation crown 6c to which it is attached, axially downwardly relative to the rim assembly 4, which remains stationary. Consequently, the conical surface of deformation crown 6c completely expands the edge 52 of upper bead-sealing ring 4a radially outwardly until it assumes the maximum expansion configuration seen in FIG. 6, ultimately to lock against the upper bead 20.2.

Figure 7:
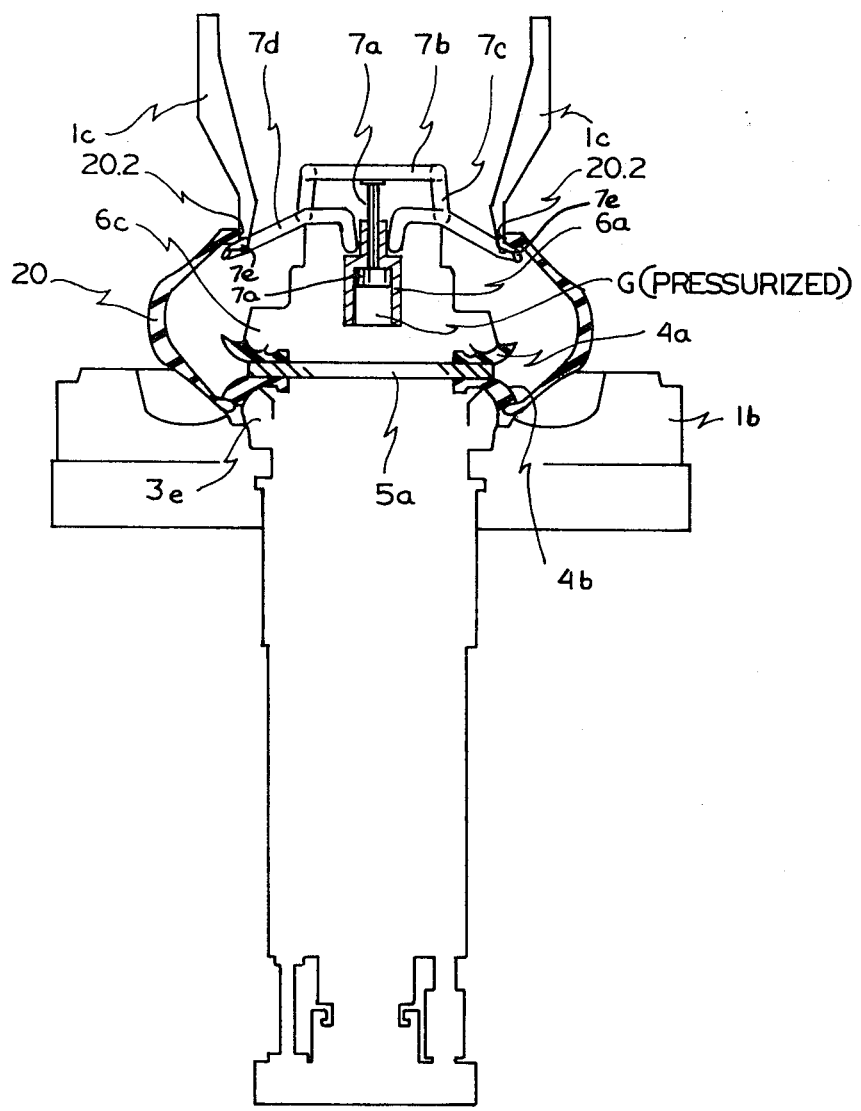

The next step, illustrated in FIG. 7, is to pressurize chamber G, causing the piston 7a' to drive rod 7a axially upwardly, carrying the drive plate 7b with it. Consequently, links 7c, which are pivoted to plate 7b, cause tire-supporting arms 7d, which are pivotally connected to links 7c and also to cylinder 6a, to rise as seen in FIG. 7, coming into position to support the entire carcass 20 by engaging hangers 7e against the upper beads 20.2 thereof from underneath.

Figure 8:
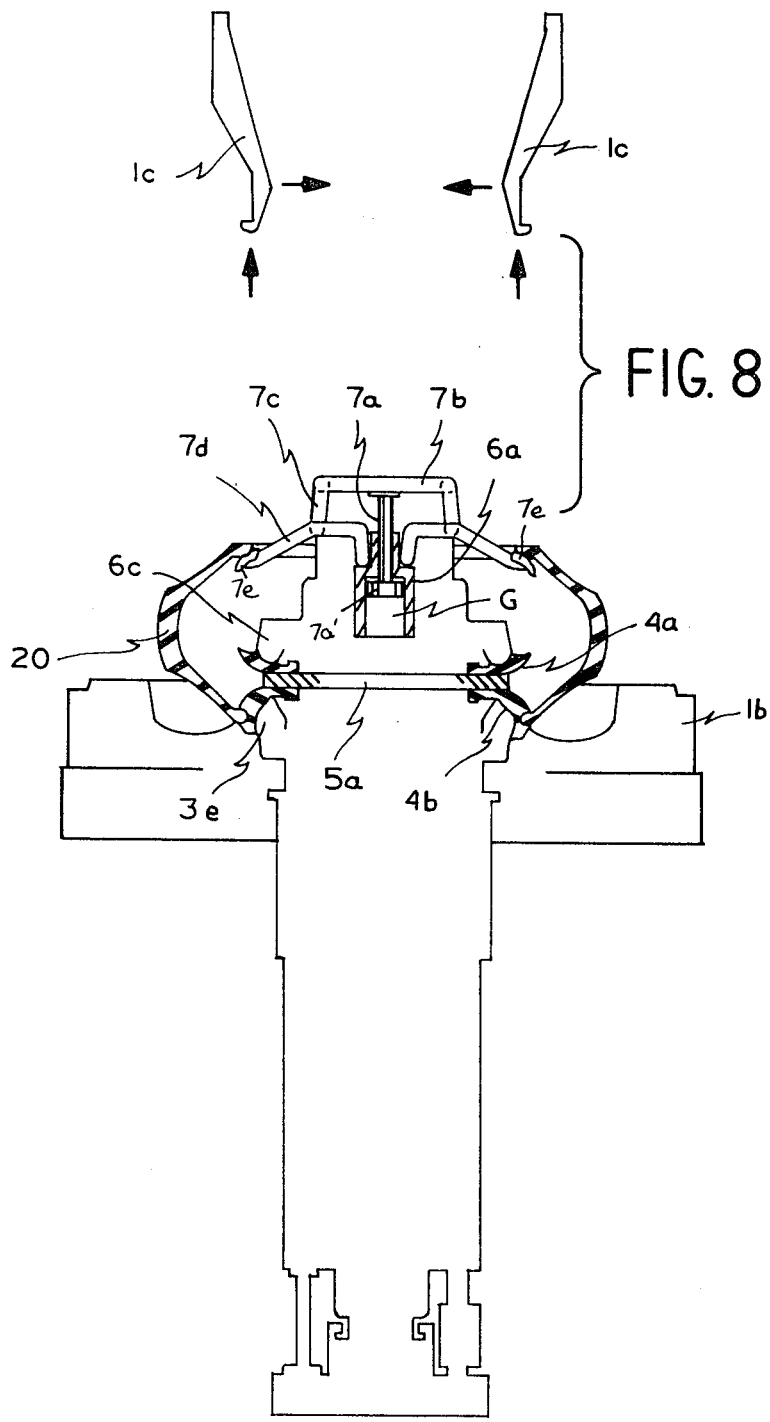

The next step of the operation, illustrated in FIG. 8, is for the loader arms 1c to be withdrawn radially inwardly, thus releasing the tire carcass 20 to the supporting arms 7d, after which the loader arms 1c are withdrawn vertically upwardly to move entirely free of the carcass.

Figure 9:
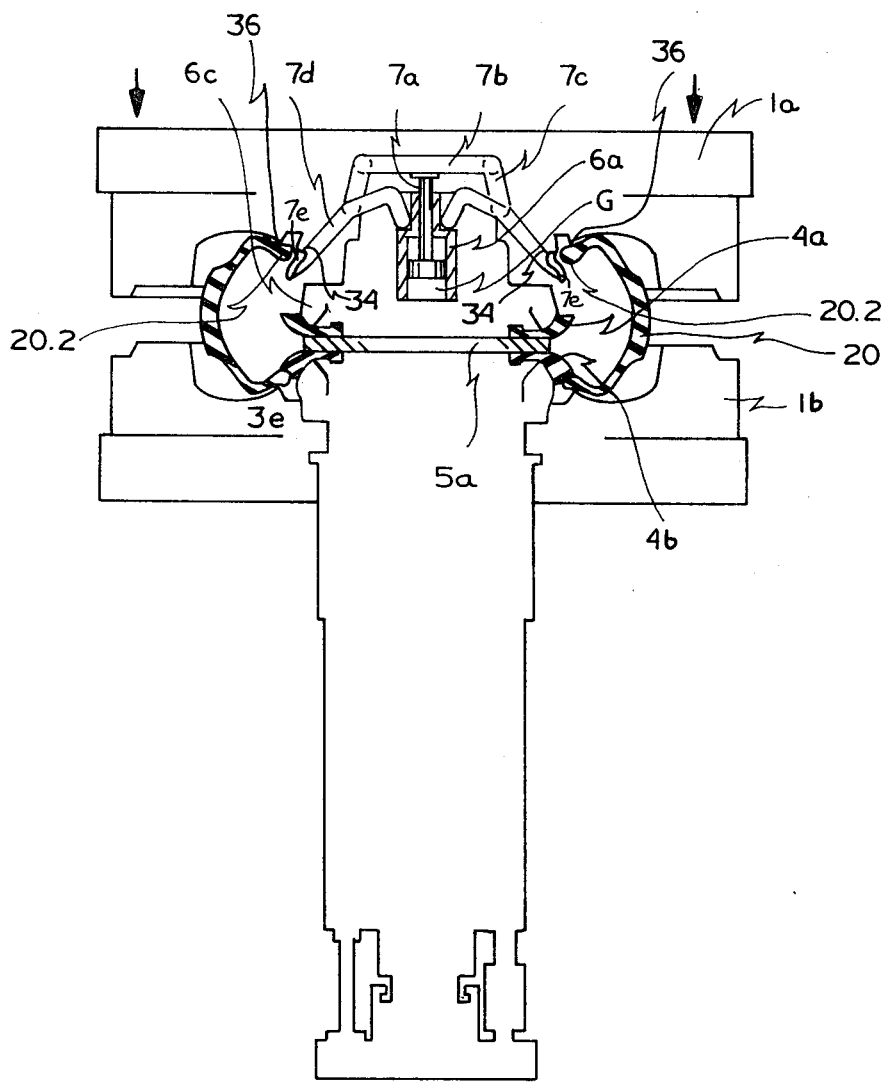

Subsequently, as seen in FIG. 9, the upper mold shell 1a is placed over the tire carcass 20 and lower mold shell 1b. As shell 1a descends, a surface 34 thereof strikes the articulated arms 7d and cams them radially inwardly, driving them from the upper tire beads 20.2. At the same time, surfaces 36 on the upper mold shell strip the upper tire beads 20.2 downwardly off the hangers 7e to complete the releasing operation. As this occurs, the upper tire beads 20.2 react resiliently against the upper mold shell 1a to become firmly seated thereagainst.

It will be understood, however, that the upper bead 20.2 is not completely released by the articulated arms 7d and hangers 7e until it is clamped (as described below) between the upper mold shell 1a and upper sealing ring 4a. In this way the articulated arms 7d accomplish a perfect centering of the upper bead 20.2 with respect to the mold shell 1a and the sealing ring 4a.

Figure 10:
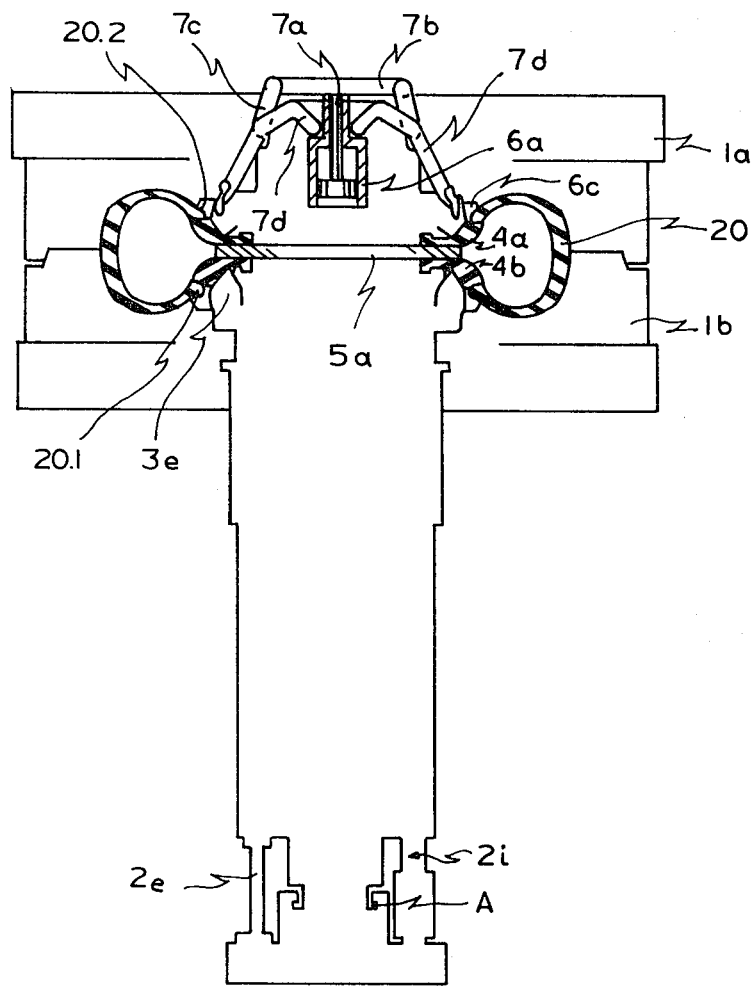
Figure 11:
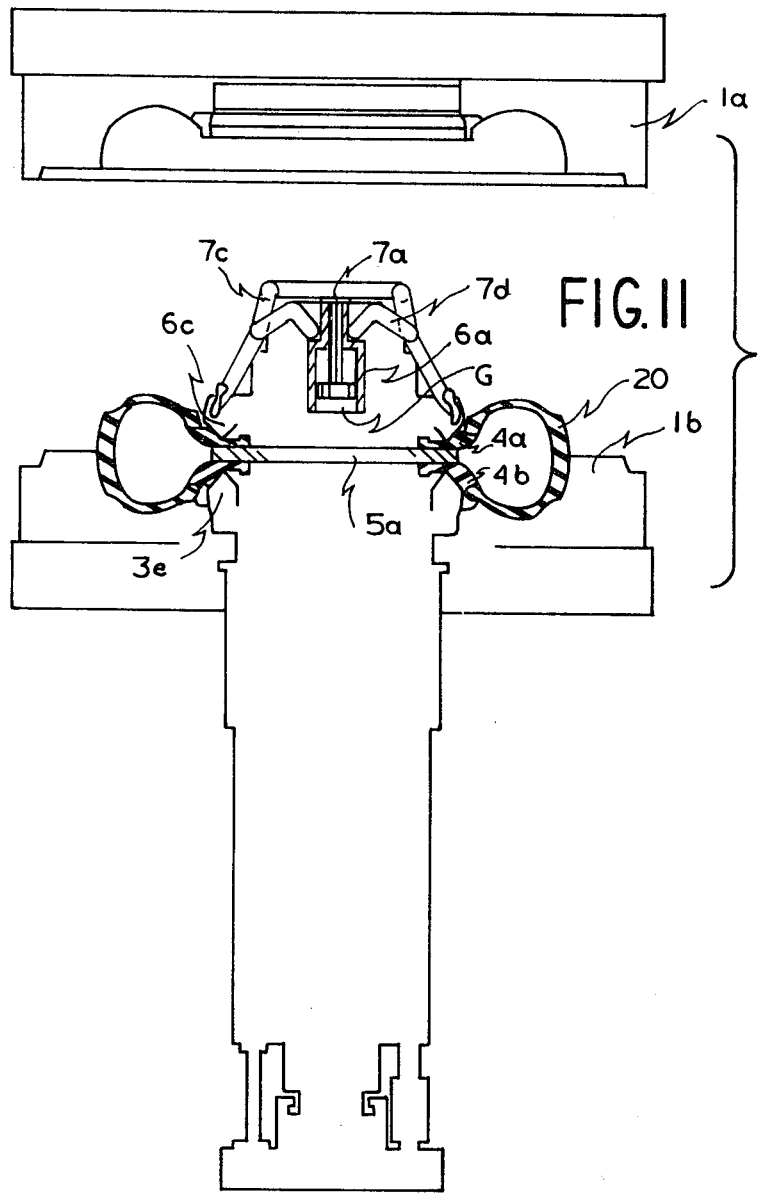

The next step is the vulcanization operation itself, illustrated in FIG. 10. The mold shells 1a and 1b are brought completely together so that lower bead 20.1 is clamped axially between lower mold shell 1b and lower sealing ring 4b, and the upper bead 20.2 is clamped between upper mold shell 1a and upper sealing ring 4a. The tire carcass 20 and members 4a, 4b and 5a then form a completely sealed envelope, into which vulcanizing fluid is introduced by means of passages 32.6 which pas through the bearing plate 5a and open into the interior of the tire carcass 20. Fluid channels 32.7 (also formed in the bearing plate 5a) later serve to evacuate the fluid from the carcass. After vulcanization is completed, the upper mold shell 1a is lifted off the tire carcass 20 as illustrated in FIG. 11.

Figure 12:
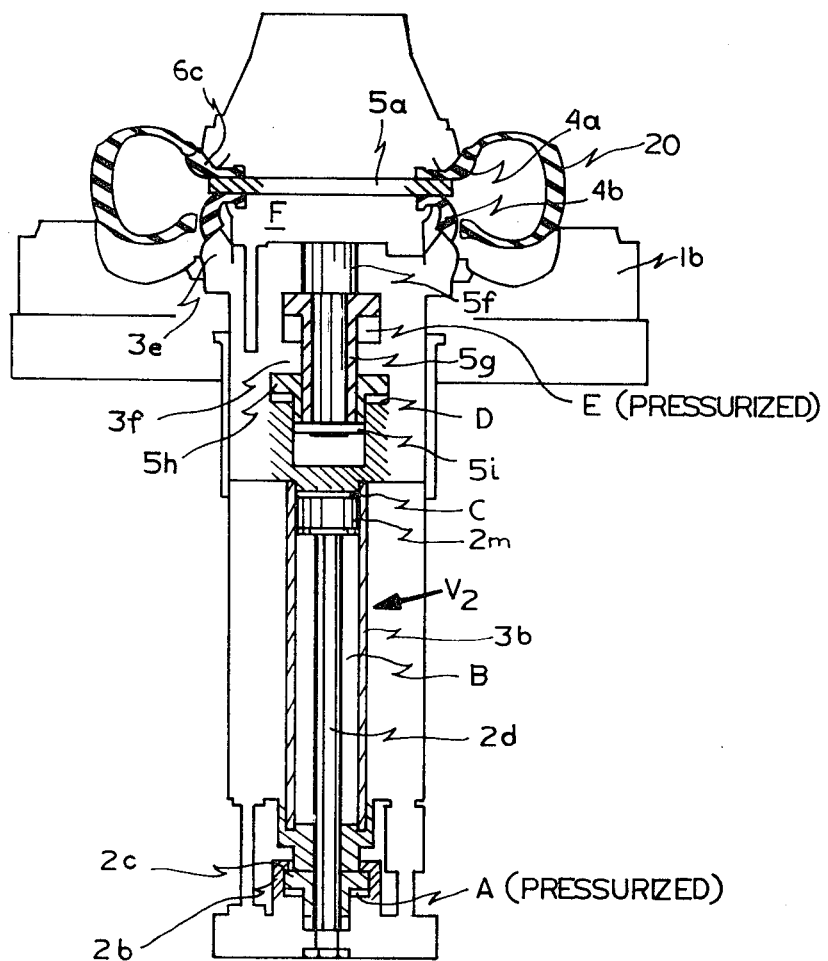

The next step in the procedure is accomplished by pressurizing chambers E and A (see FIG. 12). Pressurizing chamber E retracts the deformation crown 3e and thus collapses the lower bead-sealing ring 4b. The upper bead-sealing ring 4a remains in its expanded position, and serves to retain the tire 20 in place while the pressurizing of chamber A causes piston 2c of jack V1 to raise the assembly of shaft 5f, including rim assembly 4, thus lifting the finished tire 20 from the lower mold shell 1b.

Finally, as seen in FIG. 13, chamber C is pressurized, and chamber B is evacuated. This drives the upper cylinder cover 3c axially upwardly, raising the assembly of shaft 5f, rim assembly 4 and tire 20 still further to the level seen in FIG. 13, as bead-sealing ring 4a continues to support the tire. This permits a suitable support 10 to be brought into place beneath the tire 20. Then chamber I is pressurized so that the deformation crown 6c of the upper bead-sealing ring 4a is driven axially upwardly and returned to its initial position of FIG. 1. Consequently, the ring 4a is relaxed, releasing the tire 20 and depositing it upon the support 10.

The final step is the repressurization of chamber B, which returns all moveable parts to their lower positions, restoring the initial conditions depicted in FIG. 1. The mechanism is then ready for the next tire vulcanization cycle. In the meantime, the completed tire 20 is removed by support 10.

It will now be appreciated that this invention provides a tubeless tire mounting device, such as a vulcanization press, which requires no bag in the interior of the tire carcass. It seals instead by means of articulated and flexible bead-sealing rings driven by precise, low-backlash fluid-operated jack mechanisms, which are isolated from the interior of the tire carcass, and thus protected from the heat and pressure of the vulcanization fluid. The device also employs the bead-sealing mechanism to assist in loading and unloading the tire carcass.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. In a vulcanizing tire press, a self-sealing inflated tire mounting device comprising:
    a rim assembly including at least one elastomeric tire bead sealing ring having first and second annular edges and a bearing assembly to which said first annular edge is secured;
    said second annular edge being resiliently deformable radially outwardly from said bearing assembly;
    a mechanism for deforming said second annular edge radially outwardly whereby to distend said sealing ring to engage the bead of a tire which encircles said sealing ring;
    said ring-deforming mechanism comprising a ring-deforming member; means mounting said ring-deforming member for axial movement relative to said sealing ring; and means for driving said ring-deforming member through an axial stroke to distend said sealing ring outwardly into contact with said tire bead.

2. The device of claim 1 wherein said ring-deforming member has a generally conical camming surface which tapers toward said sealing ring to cam said second annular edge of said sealing ring radially outwardly.

3. The device of claim 2 wherein said driving means comprises:
    a fluid-driven piston and cylinder assembly;
    and means responsive to said piston and cylinder assembly to drive said ring-deforming member through said axial stroke.

4. The device of claim 1 wherein:
    said rim assembly further comprises a second such tire bead sealing ring for simultaneously engaging two beads of said tire;
    said bearing assembly comprising a central bearing member having two sides, one of said sealing rings being on one side of said bearing member and the other of said sealing rings being on the other side of said bearing member;

said bearing assembly further comprising respective means clamping the respective first annular edges of one sealing ring to respective sides of said bearing member;

and said ring-deforming mechanism is arranged to deform both of said sealing rings outwardly.

5. The device of claim 4 wherein said ring-deforming mechanism comprises respective ring-deforming members which are engageable with radially inwardly facing surfaces of respective sealing rings to deform the respective second annular edges thereof radially outwardly into contact with the respective tire beads, whereby said ring-deforming members are isolated by said sealing rings from the interior of said tire when sealing rings engage said beads.

6. The device of claim 5 further comprising:

means mounting each of said ring-deforming members for axial movement relative to its respective sealing ring;

each ring-deforming member has a generally conical camming surface which tapers toward its respective sealing ring to distend said second annular edge of said sealing ring radially outwardly;

and said ring-deforming mechanism further comprising means for driving said ring-deforming members through respective axial camming strokes to distend said sealing rings into contact with said tire beads.

7. The device of claim 6 wherein said driving means comprises:

respective fluid-driven piston and cylinder assemblies, one on one side of said bearing member and the other on the other side of said bearing member;

said piston and cylinder assemblies being operable independently of each other;

and respective means responsive to respective piston and cylinder assemblies to drive respective ring-deforming members through their respective axial strokes independently of each other.

8. The device of claim 7 further comprising a fluid conduit formed in said bearing member and opening through the outer periphery thereof at a location between said bead-sealing rings whereby to discharge fluid into the interior of said tire.

9. The device of claim 6 further comprising a structure supporting said rim assembly in such attitude that the toroidal axis of said bead-sealing rings is oriented vertically;

the ring-deforming mechanism of an upper one of said bead-sealing rings being located above said bearing member and adapted to drive said ring-deforming member thereof vertically downward into distending engagement with said upper bead-sealing ring;

the ring-deforming mechanism of the lower one of said bead-sealing rings being located below said bearing member and arranged to drive said ring-deforming member thereof upwardly into distending engagement with said lower bead-sealing ring;

and at least one of said ring-deforming mechanisms comprises fluid-operated jack means for driving at least one of said ring-deforming members vertically.

10. The device of claim 9 further comprising a horizontally oriented mold shell fixed in position relative to said supporting structure, said jack means comprising a first cylinder on said supporting structure, a first piston vertically moveable in said first cylinder, and fluid conduit means communicating with said first cylinder below said first piston, said rim assembly resting at least indirectly on said first piston and being thereby raised and lowered relative to said mold shell when sufficient fluid is introduced into and evacuated from said first cylinder below said first piston.

11. The device of claim 10 wherein said jack means further comprises a second cylinder resting on said first piston, a second piston inside said second cylinder, means affixed to said supporting structure for supporting said second piston at a fixed position within said second cylinder, said second cylinder being moveable vertically relative to both said first and second pistons, and means for introducing fluid into said second cylinder above said second piston, said rim assembly resting at least indirectly on said second cylinder whereby to be raised thereby when sufficient fluid is introduced into said second cylinder above said second piston.

12. The device of claim 11 wherein said jack means further comprises means on said second cylinder defining an upwardly extending sleeve, cover means cooperating with said second cylinder sleeve extension to define a third cylinder, a third piston moveable vertically in said third cylinder, means for introducing fluid into said third cylinder above said third piston, and connecting means responsive to downward movement of said third piston to drive said rim assembly downwardly whereby to draw said lower bead-sealing ring into camming engagement with said lower ring-deforming member.

13. The device of claim 12 wherein said jack means further comprises fourth cylinder cover means positioned above said third cylinder cover means, said fourth cylinder cover means resting on said supporting structure and cooperating with said third cylinder cover means to form a fourth cylinder, a fourth piston moveable vertically within said fourth cylinder below said fourth cylinder cover means, and means for introducing fluid into said fourth cylinder between said fourth cylinder cover means and said fourth piston whereby to drive said fourth piston downwardly and said fourth cylinder cover means upwardly, means connecting said fourth piston to said rim assembly to drive said rim assembly downwardly therewith, and said lower ring-deforming member being mounted on said fourth cylinder cover whereby to move upwardly therewith, for drawing said lower bead-sealing ring and ring-deforming member further into camming engagement.

14. The device of claim 13 further comprising tire transfer arms, means pivotally securing said arms relative to said rim assembly, a fifth piston and cylinder assembly resting at least indirectly on said rim assembly, means for introducing fluid into said fifth cylinder, and means then responsive to said fifth piston and cylinder assembly to pivot said arms relative to said rim assembly.

15. The device of claim 13 wherein said jack means further comprises a sixth piston and cylinder assembly resting at least indirectly on said rim assembly, means for introducing fluid into said sixth cylinder, and means then responsive to said sixth piston and cylinder assembly to drive said upper ring-deforming member downwardly into camming contact with said upper bead-sealing ring.

* * * * *